Sept. 21, 1965     D. R. WRIGHT     3,206,899
WALLED STRUCTURE AND METHOD FOR MAKING THE SAME
Filed Jan. 9, 1961     5 Sheets-Sheet 1

INVENTOR.
Donald R. Wright
BY
Earl D. Ayers
AGENT

Sept. 21, 1965  D. R. WRIGHT  3,206,899
WALLED STRUCTURE AND METHOD FOR MAKING THE SAME
Filed Jan. 9, 1961  5 Sheets-Sheet 2

INVENTOR.
Donald R. Wright
BY
Earl D. Ayers
AGENT

Sept. 21, 1965   D. R. WRIGHT   3,206,899
WALLED STRUCTURE AND METHOD FOR MAKING THE SAME
Filed Jan. 9, 1961   5 Sheets-Sheet 3

INVENTOR.
Donald R. Wright
BY Earl D. Ayers
AGENT

Sept. 21, 1965    D. R. WRIGHT    3,206,899
WALLED STRUCTURE AND METHOD FOR MAKING THE SAME
Filed Jan. 9, 1961    5 Sheets-Sheet 4

INVENTOR.
Donald R. Wright
BY
Earl D. Ayers
AGENT

Sept. 21, 1965 D. R. WRIGHT 3,206,899
WALLED STRUCTURE AND METHOD FOR MAKING THE SAME
Filed Jan. 9, 1961 5 Sheets-Sheet 5
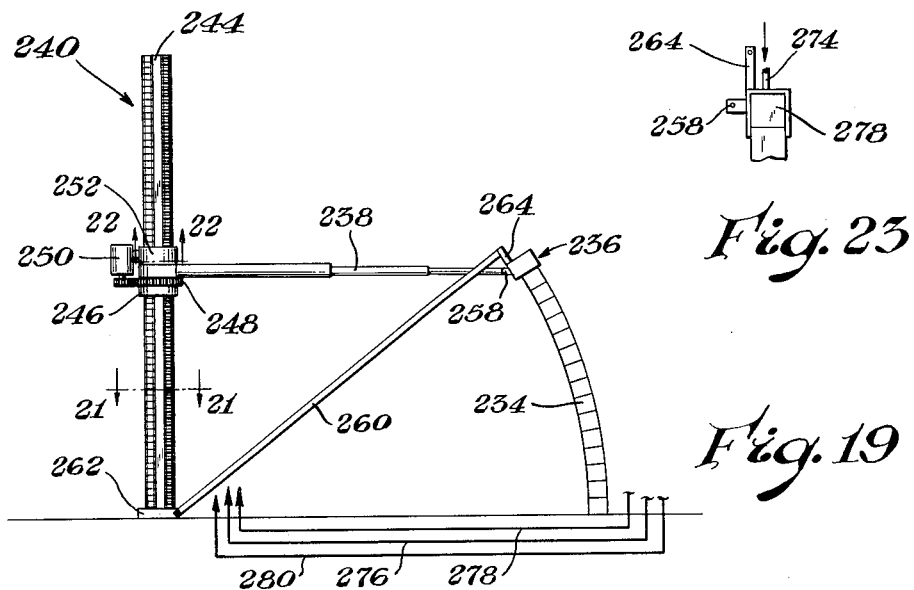
Fig. 23
Fig. 19
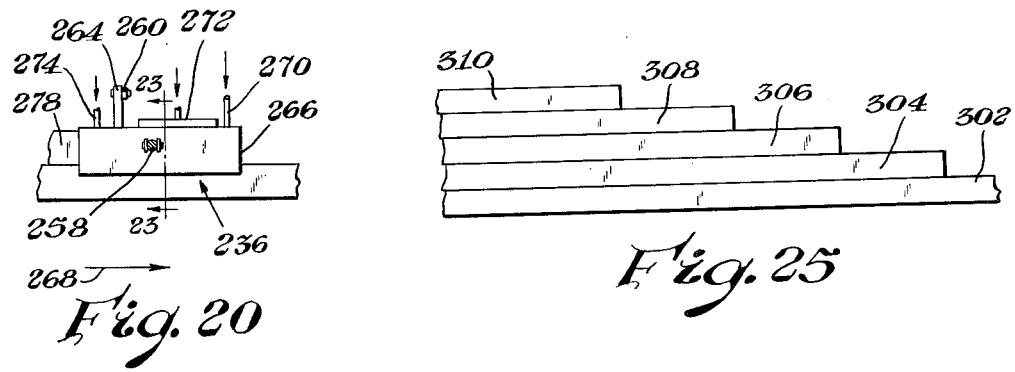
Fig. 20
Fig. 25
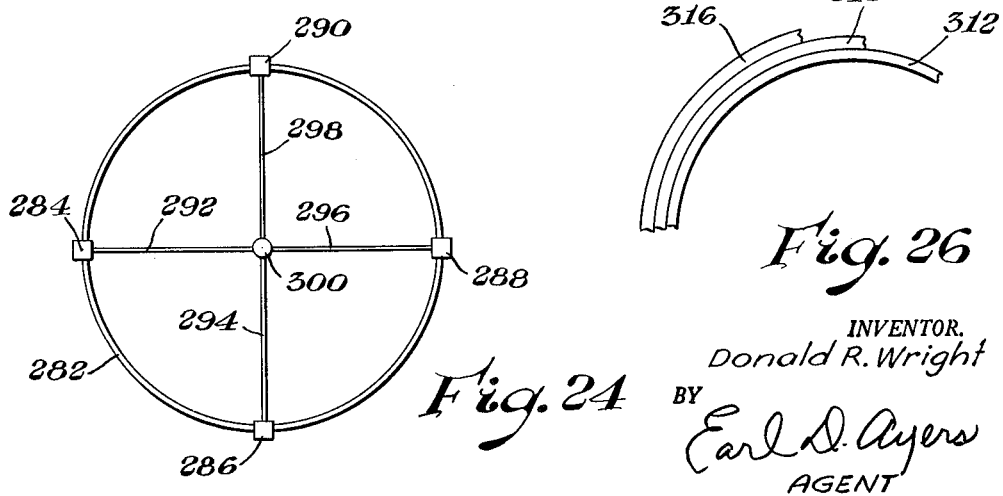
Fig. 24
Fig. 26
INVENTOR.
Donald R. Wright
BY
Earl D. Ayers
AGENT United States Patent Office 3,206,899
Patented Sept. 21, 1965

3,206,899
WALLED STRUCTURE AND METHOD FOR MAKING THE SAME
Donald R. Wright, Midland, Mich., assignor to The Dow Chemical Company, Midland, Mich., a corporation of Delaware
Filed Jan. 9, 1961, Ser. No. 81,473
7 Claims. (Cl. 52—80)

This invention relates to walled structures and methods and means for producing them, and particularly to walled structures generated by bonding together abutting surfaces of adjacent turns of an elongated length of wall material wound in the form of a coiled spiral.

A need has long existed for more economical walled structures for use as warehouses, storage and other housing uses. Also, construction time for conventional buildings is relatively lengthy and improvement in this respect is desirable. Another factor affecting the building of conventional structures is the large amount of labor and equipment involved, and these are not always available on short notice.

Accordingly, a principal object of this invention is to provide an improved, more economical and more easily erected walled structure.

Another object of this invention is to provide an improved method of constructing buildings or walled structures.

A further object of this invention is to provide improved apparatus for building structures in accordance with this invention.

In accordance with this invention a walled structure is provided in which the walls are generated by forming and bonding together edgewise successive turns of wall material laid generally in a helical spiral form to provide a unitary structure. Apparatus which "rides" along the ramp of the laid edge of the spirally generated wall is provided and prepares a surface of the strip wall material and the top surfaces of the wall structure for bonding to each other and then maintains the so-prepared surfaces in correct position in contact with each other until the bonded joint is set. Usually the apparatus includes means for driving itself along the wall.

The invention, as well as additional objects and advantages thereof, will best be understood when the following detailed description is read in connection with the accompanying drawing:

FIG. 19 is a simplified diagrammatical view showing apparatus for constructing a structure by means of a movable mold and utilizing foaming in place plastic beads;

FIG. 20 is a fragmentary side elevational view showing the movable mold of FIG. 19;

FIG. 23 is a sectional view taken along the line 23—23 of FIG. 20;

FIG. 24 is a simplified diagrammatical view showing an array of forming and sealing devices adapted to simultaneously seal a plurality of strips of wall material to form a wall;

FIG. 25 shows, in diagrammatical form, how 4 strips of wall material may be simultaneously applied on a wall, and FIG. 26 is a fragmentary diagrammatical view showing a plurality of laterally disposed abutting wall strips as used in constructing buildings of large diameter.

Figure 1:
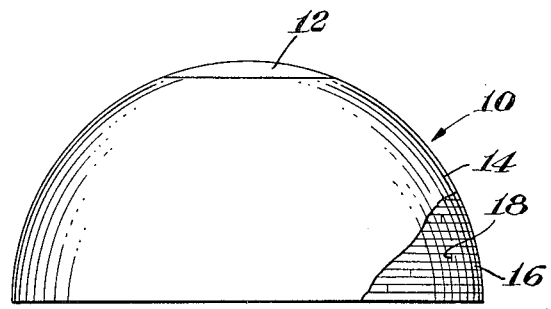
FIG. 1 is a side elevational view of a dome shaped building constructed in accordance with the present invention.

Referring to FIG. 1, there is shown a generally dome shaped building 10 having an opening at the top which is covered, for example, by a transparent closure member 12 and whose walls have a light reflective, for example, coating 14 over their outer surface. The side walls of the building comprise a spirally disposed strip 16, of expanded polystyrene, for example, which is bonded together between abutting surfaces of its turns. The strip 16 is usually made up of a plurality of strips bonded together at their end edges, as at 18, for example.

Figure 5:
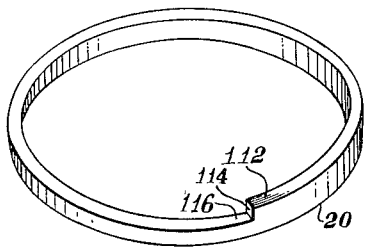
FIG. 5 is an isometric view of a starter strip used in constructing a building in accordance with this invention.

To get the building 10 started as an upwardly and inwardly extending spiral, a starter strip 20 (see FIG. 5) is provided which has a uniform taper along one complete revolution around the circumference of the building (at its base) and which has an offset 114 in elevation, equal to the height of the strip 16, where the ends of the starter strip meet.

The building shown in FIG. 1 is of circular transverse cross sectional configuration, although buildings of other transverse cross sectional configurations may be made in accordance with this invention. Buildings having elliptical or even so called "free form" or kidney shaped transverse cross sectional configurations have been made, although the "free form" buildings may not be commonly used.

Figure 2:
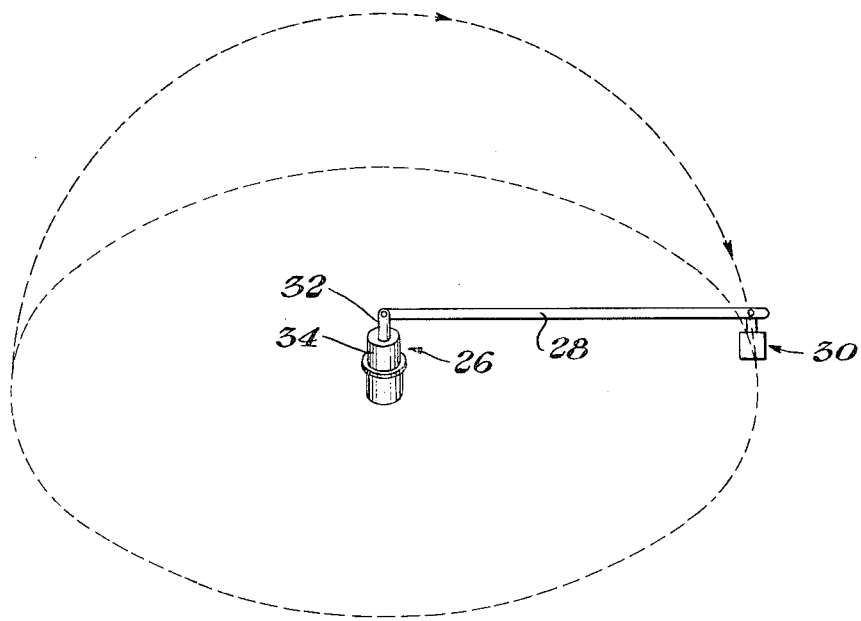
FIGURE 2 shows, in diagrammatical form, apparatus adapted to be used in constructing the building shown in FIG. 1.

FIG. 2 shows, in more or less diagrammatical form, one form of apparatus which may be used in practicing this invention. The apparatus basically consists of a centrally disposed pivot, indicated generally by the numeral 26, a rotatable boom 28, and sealing and forming apparatus, indicated generally by the numeral 30, shown schematically in block diagram form.

The pivot 26 comprises a stub shaft 32 which is disposed in a journal bearing assembly 34 which is anchored along the central axis of the structure to be built. Usually the bearing assembly 34 is anchored in the earth with the anchor or pivot point of the boom being at the foundation level of the building, but raising or lowering the point of anchorage may be done to change the shape of the building to be constructed. For example, if the anchor point of the boom is at the level where construction starts, the structure will approximate a hemisphere in form. If the anchor point is above the starting level, the shape of the completed structure will be greater than a hemisphere. Conversely, if the anchor point of the boom is below the level where construction starts the structure will be less than a hemisphere in shape.

The boom 28 is pivotally attached to the upper end of the stub shaft 32 so as to permit the boom to be only raised and lowered with respect to the pivot joint 36 and not displaced laterally. The stub shaft 32 is, of course, free to rotate laterally in the journal assembly 34.

The strip forming and sealing apparatus 30 is coupled at or near the outer end of the boom 28 at a point on the bracket 108 usually well above the center of gravity of the apparatus. Usually the coupling is accomplished by means of a pivot connection 38 which permits the apparatus 30 to pivot towards or away from the anchor point of the journal assembly 34, but in no other direction.

In simple form, the pivot connections 36 and 38 each may be slots in the boom into which a plate extends, a bolt running through aligned bores in the boom and plates to complete the pivot joint. The plates have a thickness such that they fit slidably but closely within the slots in the boom.

Figure 4:
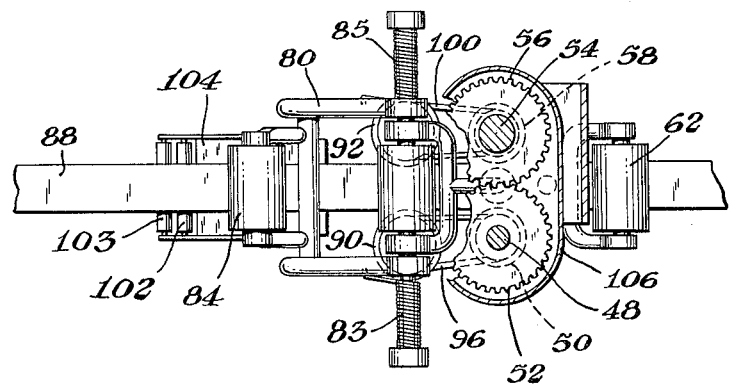
FIG. 4 is a sectional view taken along the line 4—4 of FIG. 3.
Figure 3:
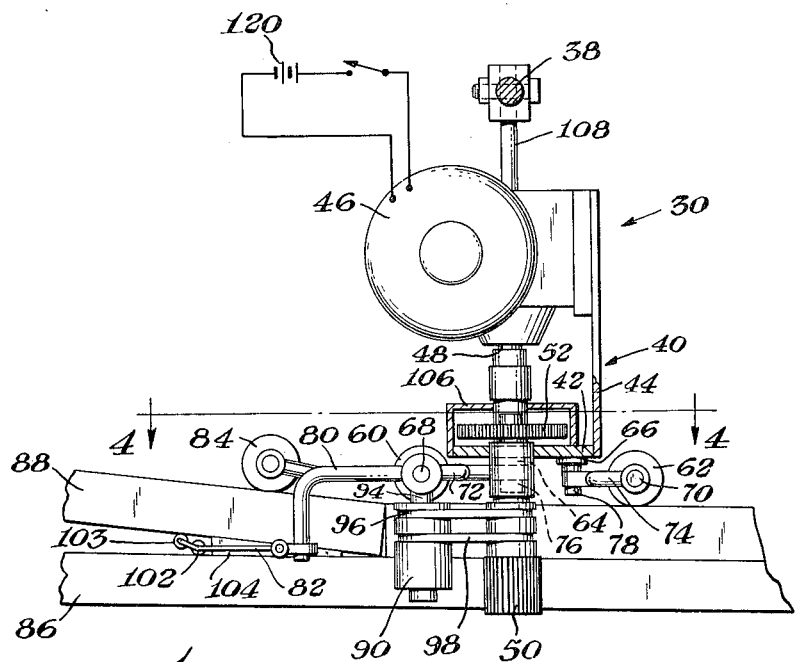
FIG. 3 is a side elevational view of an embodiment of the sealing and forming apparatus of the invention shown disposed on a wall structure to which a new turn of wall material is being added.

Referring to FIGS. 3 and 4, as well as to FIG. 2, it may be seen that the apparatus 30 comprises a frame structure, indicated generally by the numeral 40, of somewhat L-shaped longitudinal cross sectional configuration comprising a generally horizontally disposed (as illustrated) base plate 42, and an upright plate 44 fixedly secured to one end of the plate 42 and generally perpendicular thereto. A motor and gear drive 46 are fixedly secured to the end of the plate 44 which is remote from the plate 42. The longitudinal axis of the motor and gear drive 46 is parallel to the plates 42 and 44. A shaft 48, which is vertical with respect to the base plate 42, extends through the plate 42. One end of the shaft 48 is coupled to the motor and gear drive, 46 and the other end of the shaft 48 has a knurled drive sleeve roller 50 coupled to it. The shaft 48 passes through a suitable bearing (not shown) at the plate 42 and has a spur gear 52 coupled thereto just above the plate 42.

A second shaft 54, parallel to the shaft 48, extends through a suitable journal assembly (not shown) in the plate 42. A gear 56, corresponding to the gear 52, previously mentioned, is coupled to the upper shaft 54 above the plate 42, the teeth of the gears 52, 56 being meshed together.

The end of the shaft 54 which extends below the plate 42 has a knurled drive sleeve roller 58, usually like the sleeve roller 50, coupled thereto. A pair of pressure rolls 60, 62 are supported from the plate 42.

A pair of journals 64, 66 are disposed along a line bisecting a line extending between center of the shafts 48, 54.

The rolls 60, 62 each have a shaft 68, 70 extending axially therethrough which is coupled to the split end of a generally stirrup-shaped support structure 72, 74 which is rigidly coupled at its other end to the part of stub shafts, 76 or 78 which extends from the journal 64, 66.

A bracket 80 attached to the stirrup shaped support structure 72 in a downwardly and upwardly rotatable manner supports a heating element 82 in the form of a plate and a roller 84. The longitudinal axis of the roller 84 is parallel with the longitudinal axes of the rollers 60, 62. The heating plate 82 has its upper and lower surfaces at least approximately parallel with the longitudinal axes of the rolls 60, 62. The plate 82 is held in position by the springs 83, 85 below the bottom of the rollers 60, 62 to hold the plate against the upper surface of the last previous strip 86 of the structure under construction.

The bottom or the roll 84 is spaced by means of the bracket 80 from the top of the heating plate 82 by a distance equal to or very slightly less than the height of the strip 88 to be sealed to the strip 86. A pair of guide rollers 90, 92, disposed with their longitudinal axis parallel to the longitudinal axes of the drive sleeve rollers 50, 52 and between the rollers 50, 58 and the heating plate 82, are rigidly supported from the bracket 72 on short stub shafts (94 may be seen in FIG. 3). The drive sleeve rollers 50, 58 and the rollers 90, 92 each contain a pair of aligned grooves through which belts 96, 98 and 100 extend. The belt, lying in the same position as belt 98 but below belt 100, is hidden from view in FIG. 4.

Rollers 102, 103, only slightly larger in diameter than the thickness of the heating plate, are disposed across the forward end 104 of the heating plate 82, the longitudinal axes of the rollers 102, 103 being parallel but the axis of the roller 102 being closer to the strip 86 than the axis of the roller 103 whereby the roller 102 contacts the strip 86 and the roller 103 contacts the strip 88.

The gears 52, 56 are enclosed in a housing 106 which is attached to the plate 42. A bracket 108, secured to and extending above the motor and gear drive 46 and aligned with the axis of the shafts 48, 54, extends above the plate 44 and passes through a plane extending between the shafts 48, 54. The bracket 108, if extended, lies about halfway between the shafts. The pivot connection 38 at the outer end of the boom 28, is made at the upper end of the bracket 108.

In operation the pivot 26 is anchored at the center of the building to be constructed. The boom 28 is coupled to the pivot 26 and to the sealing and forming apparatus 30 at the pivot joints 36, 38 respectively. A starter strip (see FIG. 5), curved to the radius of the structure to be built and forming a complete circle, is placed along the circumference, indicated by the line 110 in FIG. 2, of the building in such a manner that the apparatus 30 will "track" or follow along the base starter strip as it progresses around the circle to start construction of the building. If the wall to be built is to extend inwardly at a pronounced angle it may be desirable to tilt the starter strip inwardly.

To start the construction of the building or other structure the apparatus 30 is placed along the starter strip (shown in FIG. 5) in position so that the rollers 60, 62, with the apparatus in position, bear against the top 112 of the starter strip adjacent to the offset 114 with the heating plate bearing against the top 116 of the part of the strip on the low side of the offset 114. A strip of wall material, expanded polystyrene, for example, has its end heated to its fusion temperature and is then passed over the top of the heating plate 82, under the roller 84 and between the lateral guide rollers 90, 92. The heated end of the feed strip of wall material, corresponding to the strip 88 in FIG. 3, is fusion sealed to the offset end 114 of the starter strip. The top surface 116 of the starter strip and bottom surface of the feed strip are forced together and fusion welded (each having been suitably heated by the heating plate 82) as the apparatus 30 is driven clockwise, in the direction of the arrow 118 (in FIG. 5), by the drive sleeve rolls 50, 58 as the motor and gear drive are energized, as by a suitable source of energy 120. The small rollers 102, 103 prevent the previously sealed wall and the feed strip from prematurely contacting the surface of the heater plate 82, thus assuring more uniform heating of the sealing surfaces.

As the apparatus 30 moves forward, additional surface of the top of the previously placed wall strip (either starter strip or sealed feed strips) and the bottom of the strip to be added are heated and sealed in place. The advancing apparatus 30 uses the lateral guide rolls 90, 92 to align the strip being sealed with the strip placed just below it. The spacing between the bottom of the roll 84 and the top of the heater plate 82 is slightly less than the specified or nominal thickness of the feed strip (88 in FIG. 3), so the strip is slightly compressed as it passes between these surfaces or is "burned" to size by the heating plate. Such an arrangement performs, in effect, a sizing of the feeder strip thickness and avoids the cumulative effects along the wall of the structure which accrue when slight variations in thickness of the feeder strip are permitted. The lateral guiding rolls 90, 92 often are designed to pull the feeder strip slightly to overcome the physical resistance encountered as the feed strip passes between the roller 84 and the heater plate 82 and to hold the newly sealed strip securely in place while the apparatus 30 moves along the strip. The belts 96, 98, 100 couple the drive sleeves 50, 58 to the rolls 90, 92. The rolls 90, 92 are driven faster than are the rolls 50, 58.

The weight of the apparatus 30, applied through the rolls 60, 62, to the just joined parts of the wall structure, is sufficient to press the heated surfaces of the wall strips together and effect a fusion bond or seal therebetween when the apparatus is disposed vertically or somewhere near that position. However, to assure sufficient pressure from the rolls 60, 62 to effect a good bond or seal between the just joined wall elements when the apparatus 30 is so disposed that most of its weight does not bear on the wall elements, as near the top of a dome shaped building, the knurled drive sleeves 50, 58 have their knurled surface angled to slightly bite into the wall surface and bear downwardly to force the apparatus 30 against the just joined wall elements and providing a predetermined amount of pressure on the feed strip by the rolls 60, 62 regardless of the slant position of the apparatus 30. Tilting the axis of the rolls 50, 58 forward at the upper end also may be done to increase the "bite" of the rolls and hold the apparatus 30 in place.

It should be noted that as the feed strip is bent to the radius of curvature of the building the thickness of the feed strip will be increased on an "inside" side (usually) of the strip. The bottom of the heater plate, however, burns off the excess height as the plate advances, thus preventing a buildup of elevational deviation in the wall structure. As illustrated, the boom holds the apparatus 30 in line to cause the correct burn off by the heater plate, but the angular relationship between the heater plate and the rolls 60, 62 could be pre-set to burn off the surface of the strip 86 to a predetermined angle.

In practice, the transverse cross sectional configuration of the strip 16 after it is sealed onto a previously laid turn, is slightly keystoned in the case of a dome shaped building. The keystoning is accomplished by compressing the strip, "burning" it to size by means of the heater plate, or by means of a mechanical cutting device (not shown) such as a rotary planer blade, for example.

Once a feed strip is started into the apparatus 30 and the sealing and wall building process begun, the apparatus 30 draws itself around the periphery of the building, sealing the feed strip of expanded polystyrene to the next previously sealed layer of similar wall material. Additional feeding strips are bonded endwise (usually, but not necessarily) as by heat sealing, to the remaining end of the strip being sealed and are successively fed into the apparatus 30 to continue the upwardly extending spiral wall of the structure.

As the structure progresses, the boom 28 will maintain the apparatus 30 on a constant radius, thus forcing the wall to extend inwardly towards the central axis of the structure as the feed material is laid in a ramp like path. Obviously, as the structure progresses the radius of curvature of the feed strips perpendicular to the longitudinal axis of the structure becomes shorter and shorter. In some instances, therefore, it has proven desirable to somewhat pre-form the feed strips when the coiling radius in the wall structure becomes very short.

As stated previously, it is normally desirable to have a disc or saucer-like closure, as at 12 in FIG. 1, for the top of the structure, since the apparatus 30 is not adapted to make a complete closure of the structure.

The rolls 60, 62 and roll 84, and heater strip 82, being pivotally mounted (at 76, 78) follow the changing curvature of the laying path followed by the feed material as construction progresses. The rolls 60, 62, 84, 90 and 92 could also, for example be replaced by suitable slide contact members, although friction losses would be increased by so doing.

It is recognized that it is possible to eliminate the pivot joint 38 (which allows relative angular movement in the vertical plane) at the outer end of the boom 28 and have a rigid connection, with the proper angular relationship established, between the boom 28 and the bracket 108. However, using a pivotal joint such as the pivotal joint 38, disposed above the center of gravity of the apparatus, permits the apparatus to track well around the structure despite any small irregularities in the structure due to non-uniformity in size and shape of the feed strip, for example. The apparatus 30 can be manually driven and the motor and gear drive 46 eliminated. Also, the motor or driving means for the apparatus can be mounted ahead of or behind the actual forming and sealing apparatus, or on top of it, and coupled thereto for pulling or pushing the apparatus.

Alternatively, the driving means for moving the apparatus around the wall as it is constructed could be at the central pivot, but this would require a more rigid, heavier boom 28 than is usually desirable. However, counter-weighting the boom would solve the boom weight problem in that it would relieve the strain on the newly formed wall.

The method of constructing structures in accordance with this invention is not limited to the use of expanded polystyrene foam or other expanded or foamed plastic, although plastic foams such as polyethylene and polyurethane have been successfully used to build structures in accordance with this invention.

Strips of wood or metal may be used in constructing walled structures in accordance with this invention, for example. In such event the heater plate 82 of the apparatus may be used to melt an adhesive coating (glue on wood, solder on metal, for example) on one or both layers of the strip being joined by the apparatus. Alternatively, a dispenser of adhesive materials may be substituted for the heating plate. A simple example of such a dispenser would be a porous roll, such as the roll 102 on the heater strip, pressure fed with a quick setting adhesive from the side of the dispenser roll as through a hollow axle, for example. Other joining means for the strip of wall materials, such as tongue and groove joints, for example will suggest themselves to those skilled in the art.

The thickness and width of the feed strip used depends on the shape and size of the structure to be built, the loading it is to withstand, and the nature of the feed strip material, among other things. When a strip of so-called high density expanded polystyrene is used in the construction of a dome shaped building which is 24 feet in diameter, for example, the transverse cross sectional configuration of the feed strip is 2″ x 2″. For larger structures made with similar materials, transverse cross sectional configurations of 4″ x 4″, 2″ x 4″ or even 6″ x 6″, for example, may be used. Although less desirable for many applications, ordinary (not so-called "high density") expanded polystyrene has been successfully used as a wall material in accordance with this invention.

Figures 15, 16:
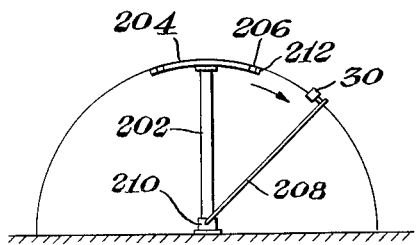
FIG. 15 is a simplified diagrammatical view showing apparatus adapted to construct a structure from the top down in accordance with this invention.
FIG. 16 is a simplified vertical sectional view of a structure in accordance with this invention which has a wheel-like lateral reinforcing structure incorporated therein.

While the invention has been described in connection with the construction of buildings from the base or ground up, it is equally possible to construct structures from the top down as shown in FIG. 15. In such event, a center pole 202 is used which supports a saucer-like structure 204 (such as the member 12 shown in FIG. 1) which includes a suitable starter strip 206 which is secured to the lower or outer edge surface of the member. The apparatus 30 is then supported by its boom 208 which is bifurcated at the pivot end and secured to a rotatable sleeve 210 and which rotates around the center pole 202 and seals the feeder strip 212 to the under surface of the previously laid turn of the strip or starter roll 206. The apparatus 30 is usually made light in weight and the knurled drive rolls 50, 58 bite into the wall material sufficiently to force the wall strip fed through the apparatus to seal, that is, become attached, to the already constructed portion of the wall. The word, seal, as used herein, is intended to include attaching, gluing, joining and other means of securing together adjacent layers of the wall strip.

Counterbalancing or spring loading the boom will, of course, offset the problem caused by the weight of the apparatus 30 attached to the outer end of the boom.

It is realized that the apparatus 30, so disposed below the wall as it is constructed, cannot easily be used to construct the wall of the structure completely down to its foundation. However, the wall may be built almost to the foundation level and then a circular wall element similar to the starter strip shown in FIG. 5 may be placed to fill the gap between the wall and foundation and heat sealed in place by passing a heating plate between the abutting surfaces. Alternatively, if the structure is suspended from a center pole the pole may be lowered and the structure set on a suitable foundation.

Incidentally, in actual practice the temperature of the heater plate is thermostatically controlled to maintain a suitable sealing temperature for the feed material. In the case of foamed polystyrene a temperature of approximately 550° F. on the heater plate at a sealing speed of about 28 feet/minute produces sufficient melting of the feed strip surface to seal well when the strip is pressed into contact with the previous turn. The actual temperature is determined by trial and error, in practice, to provide the best seal for a particular feed strip passing over the heater plate at a specific velocity as the apparatus 30 is in operation.

From the above description of the apparatus and its usage, it can be appreciated that this invention provides a walled structure as a building, shelter or enclosure which is easily and rapidly constructed with a small amount of construction apparatus and which uses relatively unskilled labor to feed strip material into the apparatus. Even the material feeding problem is simplified in relatively small structures when strip materials made of light weight foam are used, as the feed material may be disposed on a reel secured to the boom 28 and thence fed into the apparatus 30.

It is assumed in the apparatus shown in FIGS. 3 and 4 that the heater plate is connected to an electrical energization source. However, apparatus driven by an internal combustion engine and utilizing the exhaust gas of the engine to heat the heater plate has been successfully used. Flame heating adjacent to the actual sealing surface of the heater plate may also be applied to reach the desired sealing temperature.

The apparatus 30 may be adapted for use without the boom 28 described herein. Apparatus 30 having a suitably low center of gravity and having a guide arm contacting one or both sides of the previously formed side wall to maintain proper curvature to form the dome (the function performed by the boom 28) may be used in making structures where the inward curvature of the domed structure is uniform. In such apparatus it is assumed that the motor and gear drive apparatus would be below the top of the knurled drive rolls to provide a low center of gravity for the apparatus. Unless separate drive motors are used on each knurled drive roll the side of the apparatus opposite the drive motor is preferably counterbalanced.

Figure 6:
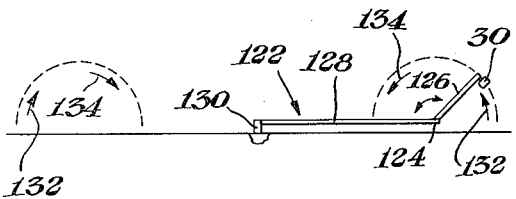
FIG. 6 is a diagrammatical view of apparatus in accordance with this invention for making a hemitoroidally shaped structure.
Figure 7:
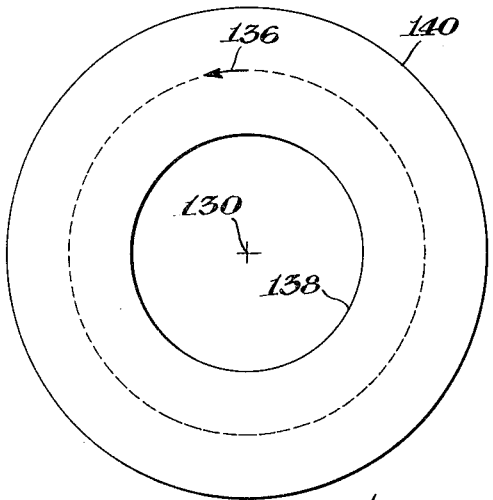
FIG. 7 is a schematic view showing the inner and outer wall limits and path of the hinge on the boom in the apparatus shown in FIG. 6.

Referring to FIGS. 6 and 7, it may be seen that it is also practical in accordance with this invention to construct structures which are shaped as a donut which is bisected along its horizontal axis. To build such a structure the apparatus 30 is mounted, as shown in diagrammatical form, at the end of a boom 122 which is hinged as at 124 between its ends but otherwise is like the boom 28 shown in FIG. 1. The boom 122 used in building the "semi-donut" shaped structure is hinged to permit the hinged part 126 to move up and down but not laterally. The hinged or outer part 126 of the boom is shorter than the part 128 of the boom which is coupled to the central pivot 130 at a fixed angle, say 90°, and has the apparatus 30 mounted at the outer end thereof.

A starter strip (such as the strip 20 in FIG. 5, for example) having the diameter of the outside of the structure is centrally disposed with respect to the pivot 130 as described in connection with the construction of a structure as shown in FIG. 1. The wall is then started and abutting sides of adjacent turns of wall material are sealed or stuck to each other on being laid in spiral form as before. However, only the hinged outer section 126 of the boom 122 moves upwardly as shown by the arrow 132 as the wall construction progresses since the inner section of the boom is coupled to the pivot at a fixed angle.

The apparatus 30, being adapted by virtue of its knurled drive rolls 50, 58 to hold itself onto the wall structure, continues to construct the wall directly overhead of the point where the boom sections are hinged together and then down the inner side wall as indicated by the arrow 134. The inner side wall of the structure is accordingly built from the top down. It is apparent, though, that the inner side wall cannot be constructed to the low level obtained on the other side because of the boom passing underneath the wall unless the boom travels in an excavation. Thus, in most instances, the final wall turns on the inside wall may be formed and sealed by a simple sealing device suitable for the purpose or done manually. Alternatively, the base of the structure may be cut off along the outside wall to even the wall structure on both sides. In FIG. 7 the arrow 136 indicates the path of the boom hinge 124 and lines 138, 140 indicate the base line of the inner and outer wall, respectively.

Figure 9:
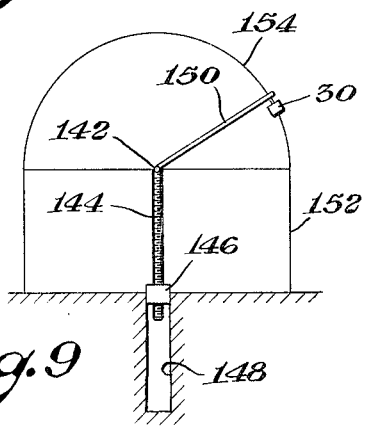
FIG. 9 is a simplified diagrammatical view of the apparatus of FIG. 8 shown in the domed top making position.
Figure 8:
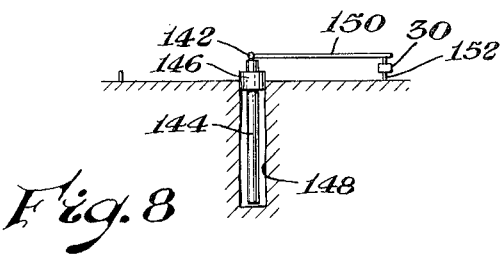
FIG. 8 is a simplified diagrammatical view of apparatus in accordance with this invention which is used in making structures having vertical walls and domed tops, the apparatus being shown in the wall starting position.

The construction of a structure having a cylindrical wall and a domed top may also be made in accordance with this invention as shown diagrammatically in FIGS. 8 and 9. To produce such a structure the pivot 142, corresponding to the pivot 26, is at the upper end of a threaded rod 144 which is coupled to an anchored "nut" 146, supported over a bore hole 148, for example, having internal threads adapted to mate with those on the rod. The pitch of the threads is such that the rod, which is coupled to the pivot so that rotation of the boom 150 causes an advance upwardly in one revolution a height equal to the thickness of the feed strip of the wall material being fed into the apparatus 30.

With the rod 144 threaded through the nut 146 so that the boom 150 is parallel with the starter strip for the structure when starting the cylindrical side walls (the starter strip being like the strip 20 in FIG. 5, for example), a strip of wall material is fed into the apparatus 30 and the wall construction proceeds by spirally forming and sealing together turn upon turn of the wall strip. Since the pivot 142 (being rigidly coupled to the rod) rises at the same rate as does the apparatus 30, cylindrical walls 152 rather than inwardly extending walls are constructed. However, when sufficient vertical wall height is achieved, the rigid coupling between the boom and the rod (through the pivot) is released, the rod is held in its position of the moment, and the apparatus 30 continues to advance, laying more of the wall structure. The wall structure now being laid to the radius of the boom by the apparatus 30, because the rod isn't further advanced, is the usual domed walled structure 154 as described in connection with FIG. 1.

Figure 11:
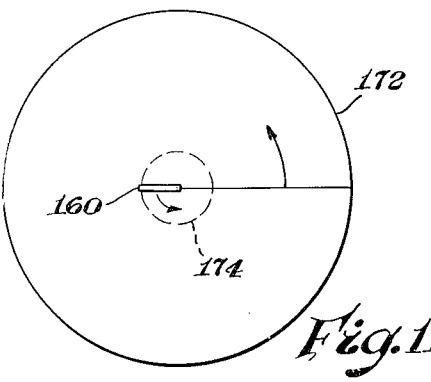
FIG. 11 is a schematic view showing the base periphery of the structure made as in FIG. 10 with the path of the hinged part of the boom shown in broken lines.
Figure 10:
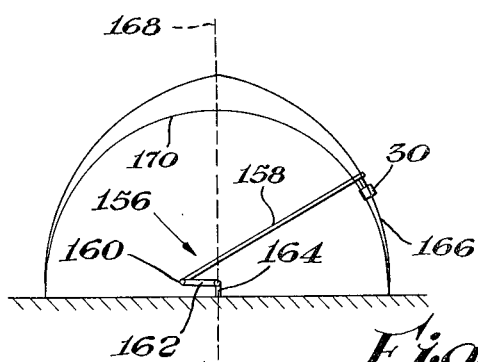
FIG. 10 is a simplified diagrammatical view showing apparatus which is adapted to build structures which are higher than their width.

As shown diagrammatically in FIGS. 10 and 11, structures having yet another wall configuration may be made using a hinged boom 156 wherein the part 158 of the boom from the hinge 160 to the outer end thereof where the apparatus 30 is secured as in FIGS. 1 to 4 is longer than the boom section 162 which extends from the pivot 164 to the hinge.

For example, let us assume a total boom length of 30 feet with the outer section 158 of the boom beyond the hinge 160 being 20 feet long and folded back over the central pivot 164 as the construction of the structure begins. In this situation the apparatus 30 is set upon a ramp-like starter strip as a beginning turn and construction begun as in building a structure as illustrated in FIG. 1. As the wall 166 progresses upwardly the rate at which the wall approaches the central axis 168 of the structure is found to be less than when a boom setup as shown in FIG. 2 is used. The reason for this is that in the instant case the effective length of the boom, e.g., the lentgh of the part of the boom extending from the hinge 160 to the apparatus 30 is greater than the distance from the pivot to the wall of the structure. Thns, the structure may have a wall height which is greater than its radius. Such an arrangement finds utility when the structure is to be used for shedding snow loads and storage of tall objects adjacent to the wall, for example. The line 170 represents, to show a comparison, the wall height which would be achieved if the length of the boom were the distance between the pivot 164 and the base or lower end of the wall structure 166.

In FIG. 11 the line 172 represents the base circumference of the structure and the broken line 174 represents the path of the hinge 160 as the boom 156 is rotated.

Structures made in accordance with this invention may be used for a variety of purposes such as radomes, warehouses, thermally isolated enclosures, tank covers, housing for personnel, or forms for making structures of yet another material where the form may or may not remain in place after the rest of the structure is completed.

When the structures are made of various expanded plastic materials, for example, there is little attenuation of radio frequency energy as it passes through the material. Further, such structures tend to flex when subjected to atmospheric overpressures and are well adapted to withstand the effects of blasts which occur nearby.

In some instances it is, however, desirable to provide reinforcing material as by embedding it between the turns of wall material. Examples of such reinforcing means are shown in FIGS. 12, 13 and 14.

Figures 12, 13, 14, 14A:
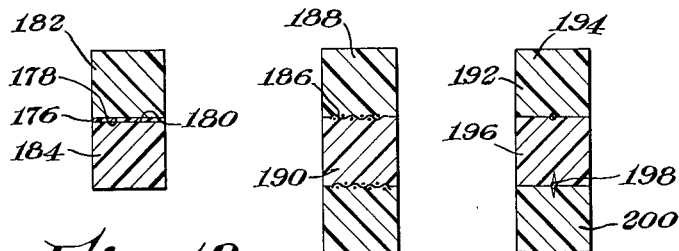
FIGS. 12, 13 and 14 are fragmentary cross sectional views showing reinforcing materials bonded between adjacent turns of the wall strip.
FIG. 14a is a fragmentary schematic view showing reinforced wall turns abutting against a frame defining an enclosure.

In FIG. 12 the reinforcing is a strip of unexpanded polystyrene 176 which is bonded to the normally abutting surfaces 178, 180 of the turns 182, 184 of expanded polystyrene strip, for example.

The strip 176 and strips 182, 184 may be heat sealed together or bonded by suitable adhesives.

In FIG. 13 a strip 186 of expanded sheet metal is sealed between adjacent wall turns 188 and 190 of expanded polystyrene. The metal, if heated, easily embeds itself in the turns 188, 190 and provides excellent reinforcing. Alternatively fiber glass may be substituted for the expanded sheet metal as a reinforcing material.

FIG. 14 illustrates two kinds of wire reinforcing means. The wire 192 is sealed between the turns 194, 196 with the wire either being heated to "melt in" or pressed into the strips.

The wire 198, of the barbed wire type, for example, is sealed between the wall turns 196, 200, providing a mechanical bite into the wall strip structure in addition to being heat sealed therein.

The wire reinforcing provides a convenient means to install framed openings in the structure without weakening it. For example, the plastic wall has an opening cut in it to fit the frame, but the reinforcing wires extend beyond the opening and, as shown in FIG. 14a, pass through small apertures in the frame. The wires 318 which are embedded between the turns 320 are then drawn tight against the frame 322 and tacked or otherwise rigidly secured, as at 324, to the frame to maintain the reinforcing wires under tension. The use of reinforcing material between the turns of wall material, on one or more surfaces thereof, particularly strip reinforcing elements, permits larger structures to be made without increasing the transverse cross sectional dimensions of the wall strip than would be the case if the wall is not so reinforced.

It is, of course, entirely practical to attach spray means to the apparatus 30 to spray coat the outer or inner wall surfaces, or both, as the building construction progresses. Another surface preparation which has been accomplished is the glaze sealing of an expanded polystyrene wall surface. To do this, a heater plate is coupled to the apparatus 30 with its surface spring loaded to bear against the wall surface to be glazed.

It is likewise practical to provide booms which may be varied in length to change the rate of inward curvature of a wall as it is constructed. Pantographically and hydraulically actuated means for controlling boom length have geen used. Telescoped and screw extended booms have also been used.

It is recognized that the feed strip of wall material may be sized before being fed into the forming and sealing apparatus or sized as it passes through such apparatus in order to provide a particular vertical contour to the wall made of such strip. Material may be sized and formed as it enters the apparatus 30 by controlling the angular relationship between the roller 84 and the heater plate 82.

While the structures described herein are those in which the apparatus used results in the wall strip being, when viewed in transverse section, more or less key-stoned as the wall is built, it is within the scope of this invention to provide structures wherein the wall projects inwardly or outwardly as it is constructed by means of offset lapping of the wall-forming strip. Such offsetting may be provided by pre-setting the position of the guide rolls 90, 92, for example, and cutting off the rolls so that only one layer of wall strip (the one being laid) is affected by these rolls.

It is likewise possible to make walled structures in accordance with this invention by means of a forming and sealing apparatus which is adapted to meter so called "foaming in place" expandable palstic (polystyrene, for example) beads into a movable die along the wall and inject heat (as by steam) through the beads to expand them to fill the moving mold as it suitably progresses around the wall structure. In such an arrangement, shown in FIGS. 19-23 inclusive, the beads and steam may be transported from the central part of the structure 234 being built to the forming and sealing apparatus 236 through suitable conduit means along the telescoping boom 238 (FIG. 19) extending from the central boom supporting pole 240 to the sealing and forming apparatus.

The boom supporting pole 240 has external threads whose pitch is such that in one revolution the rise is equal to the height of one turn of deposited wall material. The pole 240 has longitudinally extending keyways 242, 244. The boom 238 is supported from the pole 240 by means of an internally threaded sleeve 246 which is coupled to the threads of the pole 240. The sleeve 246 has gear teeth 248 extending around its external circumferential surface. A motor 250 is secured to a sleeve 252 having keys 254, 256 adapted to mate with the keyways 242, 244. The sleeve 252 is of slightly larger internal diameter than the outer diameter of the pole 240 and is adapted to slide along the pole. A gear 258 is coupled to the motor 250 and to the gear teeth 248 on the sleeve 252.

The outer end 258 of the telescoping boom 238 is pivotally secured to the side of the forming and sealing apparatus 236. A boom 260, coupled to a rotatable sleeve 262 at the lower or ground end of the pole 240, is pivotally coupled at its upper end to a bracket 264 secured to the upper part of the apparatus 236. The apparatus 236 is adapted to pivot only towards and away from the center pole 240. The forming and sealing apparatus 236 comprises a hollow elongated mold whose side walls are usually curved to conform to the radius of curvature of the structure to be erected. The mold is of U-shaped transverse cross sectional configuration, the height of the sides being greater than the thickness of the wall layer being formed and sealed to the wall previously constructed. The end 266 of the apparatus 236 is closed, that being the end of the apparatus which is in the direction of movement around the structure 234 (as indicated in FIG. 20 by the arrow 268).

A bead entry conduit 270 is disposed near the closed end 266 and extends through the top of the apparatus. Behind the conduit 270 is a steam inlet and deflecting conduit 272 which likewise extends through the top of the apparatus 236. Near the open rear end of the apparatus 236 a quench injection conduit 274 extends through the top of the mold of the apparatus. A steam line 276, bead metering conduit 278 and quench fluid line 280 extend from suitable sources (not shown) and are adapted to be coupled to the various corresponding inlet means in the apparatus 236.

In operation the mold is in position at the base of the structure and beads are metered into the structure as the apparatus is driven around the circumference of the structure at a predetermined rate by the motor 250. Steam is injected into the apparatus 236, causing the beads in the mold to expand and fill the mold of the apparatus 236 to the top thereof.

The boom 238 holds the mold apparatus in correct elevation to prevent excessive vertical expansion of the beads in the mold which might otherwise occur and thus raise the wall elevation unevenly around the circumference. Quenching material such as water or cool gas, for example, is injected through the conduit 274 near the rear end of the apparatus 236 in order to cool the surface layer of beads at the rear end part of the mold and "set them" so that further expansion of the external shape of the beads does not occur after the mold moves on and the expanded beads are uncovered.

In FIG. 20 it may be seen that the sides of the mold extend over the previously deposited wall part 276 and that the new wall layer 278 extends behind the apparatus 236 and is bonded to the wall part 276.

The boom and central rod apparatus illustrated in FIG. 19 may also be used to construct structures in which the apparatus 30 is attached to the outer end of the boom. In such a situation the apparatus 30 is pivotally connected to the end of the telescoping boom 238 at, or near to, the plate 42 and the boom 260 is coupled to the apparatus 30 as at the pivot 38. However, when such an arrangement is used the driving means on the apparatus 30 may be eliminated and the rolls 50, 58 and the rolls 90, 92 would all serve, in effect, as guide rolls.

When dome shaped structures of large diameter are to be made it is often desirable to improve the lateral stiffness of the structure. One means for achieving lateral stiffness of such structures is illustrated in FIGS. 16, 17 and 18.

Figure 18:
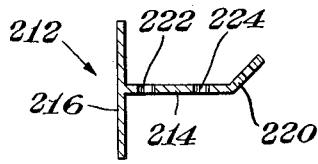
FIG. 18 is a sectional view taken along the line 18—18 of FIG. 16.
Figure 17:
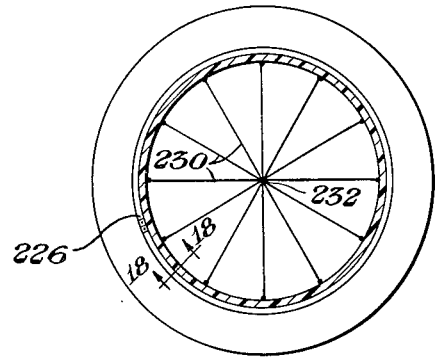
FIG. 17 is a sectional view taken along the line 17—17 of FIG. 16.
Figure 21:
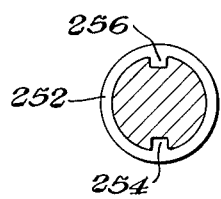
FIG. 21 is a sectional view taken along the line 21—21 of FIG. 19.
Figure 22:
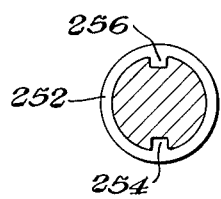
FIG. 22 is a sectional view taken along the line 22—22 of FIG. 19.

Referring to FIGS. 16, 17 and 18, a member 212 having a somewhat T-shaped transverse cross sectional configuration as shown in FIG. 18 circumscribes the structure at a height of about 2/3 of the height of the structure as shown in side elevation in FIG. 16 and in a plan view in FIG. 17. The number 212 has a web part 214 which is generally perpendicular to the flanged part 216. The web part has a flat part which is as wide as the wall thickness of the structure 218 and an angularly disposed inner part 220 which, when the member 212 is installed in a structure, is approximately parallel to the base of the structure. The web part 214 has slots 222, 224 disposed at frequent intervals along its length and the inner rim part 220 has a symmetrical array of bores 226 extending therethrough along its periphery.

When the wall height reaches the point where the member 212 is to be installed, the web part of the member 212 is heated and placed over the last laid wall strip and sealed, as for example, by "burning" itself through the top surface of the wall strip for a distance equal to or slightly greater than the thickness of the web part 214, the wall material extending through the slots 222, 224. A sufficient length of the member 212 is so installed to provide a complete spiral around the structure, the ends being vertically offset, as measured between the web parts 214, by a distance which is approximately equal to the thickness of the strip of wall material. The adjacent ends are secured together by a suitable clamp 226 (see FIG. 17).

The member 212, when so assembled in the structure 218, functions as the rim of a wheel.

After the member or ring 212 is installed, the next turn of wall feed strip is sealed to the part of the preceding strip which extends through the slots 222, 224 of the rim and the wall construction continues as to the point where the top cap 228 is to be installed.

An array of wire spokes 230 are secured between the bores 226 in the rim and a central hub 232. The spokes are tensioned to hold the rim in circular or other form according to the actual shape of the building.

The member 212 is made of aluminum or other material of suitable weight and strength. The wire spokes 230 and central hub 232 are likewise made of light weight, high strength material.

Essentially the reinforcing system comprising the rim 212, spokes 230 and hub 232 acts as a wheel whose rim will maintain its configuration as long as the spokes are intact and adjusted to be under proper tension. The effect is that of providing a new, rigid base to the structure at a predetermined distance above the base floor of the structure. A structure so reinforced has considerably more lateral rigidity, yet the reinforcing means adds comparatively little to the overall weight or cost of the structure.

Other means of providing lateral reinforcing, which may or may not require the use of vertical wall supporting members, are within the scope of this invention. Additionally one or more of such wheel-like reinforcements at different elevations may be used with or without spokes.

When buildings or other structures having large perimeters or cross sectional dimensions are constructed in accordance with this invention it is anticipated that more than one strip of wall material will be spirally wound and sealed simultaneously. Such an arrangement is illustrated in FIGS. 24 and 25.

Referring to FIG. 24, which is a schematic plan view, a walled structure 282 is being constructed by means of an array of 4 sealing and forming devices 284, 286, 288, 290, each of which may be of the type of the apparatus 30, for example. The devices 284–290 inclusive are each attached to a boom 292, 294, 296, 298 respectively, which is rotatably coupled to a central pivot 300 by a pivotal connection such as the pivot 36 shown in FIG. 2. The booms 292—298 may or may not be coupled together to maintain their radial spacing around the perimeter with respect to each other. If pre-set radial spacing is to be maintained for each of the devices 284–290 the drive means of the devices may be individual synchronous motors for each device or may be a single motor coupled to the pivot 300 and transmitting driving power through the booms to the devices.

The drive arrangement for the boom 238 in FIG. 19 is an example of such a pivot coupled drive means although the drive means could remain at one elevational point along the pivot rather than climb a rod as is done in the device shown in FIG. 19.

FIG. 25 illustrates a situation where 4 strips have been sealed simultaneously, the strip 302 being a previously sealed strip and strips 304, 306, 309, and 310 being sealed to the structure in that order by the devices shown in FIG. 24, for example. It is, of course, necessary, that the lower strips be laid ahead of the upper strips for a distance sufficient to allow the forming and sealing devices to clear one another.

While the symmetrical arrangements of the booms 292–298 is not essential to the construction of a structure, such an arrangement of the booms provides lateral bracing to the structure as the wall progresses upwardly in addition to the booms performing their function in connection with the forming and sealing devices.

It is also anticipated that as structures of larger and larger diameters or cross sectional configurations are constructed more than one laterally disposed strip of wall material may be required to provide a wall of sufficient strength. Such an arrangement is shown in FIG. 26 in which 3 wall strips 312, 314, 316 are laid in side by side abutting relationship and may be sealed to each other and to the strips below to provide a unitary structure. The sealing of the lateral strips to each other may be accomplished, for example, by modifying the apparatus 30 by disposing another heater plate (of the same type as the plate 82) slightly ahead of and aligned between the rolls 50, 58. In such event the so modified apparatus 30 may serve, if desired, only the function of sealing together laterally disposed strips and need not serve to add to the vertical height of the structure by adding on new elevational strips of wall material as when the heater plate 82 is also utilized in the forming and sealing operation. Obviously, if more than two laterally laid strips of wall material are to be sealed together, the rolls 50, 58 may be spaced apart an appropriate distance to span the strips and more than one heater plate, appropriately spaced, be disposed ahead of and aligned between the rolls 50, 58 to seal together all the laterally disposed strips.

If the modified device 30 is to serve only to seal togeather laterally disposed turns of wall material which have already been sealed to the turns below them, the modified apparatus need not necessarily be guided by a boom even though a boom controlled system is used in forming and sealing the elevation adding turns of the structure.

In order to use two or more forming and sealing devices a starting strip having an offset height equal to the height of the number of strips which are to be sealed, or the equivalent thereof, is used. To start the structure using a plurality of forming and sealing devices the initial strip to be sealed is placed with its end abutting against the offset of the starting strip and an appropriate length of strip sealed as the sealing and forming device advances. After the device has advanced sufficiently, the second, third and other strips are started in a similar manner. The lower strips are always, however, sealed ahead of all the strips of wall material lying above them.

The above described starting arrangement is necessary if the sealing and forming devices are to describe continuous spirals as the wall is constructed.

When two or more strips of wall material are to be sealed in side-by-side relationship the starting strip will be wide enough to accommodate the strips in side-to-side relationship.

While the simultaneous laying and sealing of a plurality of wall strips has been described, it should be realized that the strips need not necessarily start at one offset in the starting strip. For example, if four strips are to be wound and sealed simultaneously, a starting strip having four offsets symmetrically spaced at intervals around its periphery is used.

Each offset is equal in height to the thickness of one wall forming strip and the ramp part between one offset and the next tapers uniformly. The ramps increase in elevation in the direction in which the wall laying apparatus is to be moved. In other words, the slope of each ramp is such that the ramp rises a height equal to the thickness of the wall laying strips between each two adjacent offsets. Preferably the strips are of equal thickness.

What is claimed is:

1. A hollow closed walled structure of generally dome shaped configuration comprising a continuous pre-cut composite cellular plastic strip disposed in superposed turns as a spiral and defining said dome shaped configuration, said plastic strip having the lower surface of said strip at each of said turns overlying and in substantially continuous contact with the upper surface of said strip at each of the turns next below, and said surfaces in continuous contact being fusion sealed together.

2. A structure in accordance with claim 1, wherein said wound strip comprises lengths of said cellular plastic fusion sealed end to end to provide a continuous strip forming the wall of said structure.

3. A walled structure in accordance with claim 1, wherein reinforcing means are disposed between said contacting fusion sealed surfaces.

4. A structure in accordance with claim 1, wherein opposing surfaces of said strips are tongue and grooved, successive turns being mated together and fusion sealed by solvent means applied to said tongue and grooved part.

5. A method of generating a hollow closed walled structure comprising providing an initial looped strip of wall material in the shape of the starting peripheral surface of the structure to be generated and then successively winding continuously at least one pre-cut strip of cellular plastic wall material spirally onto and from said initial looped strip and onto successive continuous loops thereof and sealing the lengthwise abutting surfaces of said loops together as they are wound.

6. A method in accordance with claim 5, wherein said sealing is a fusion sealing of the abutting surfaces.

7. A method in accordance with claim 5, wherein the transverse cross sectional configuration of adjacent loops are continuously shaped as said sealing is effected.

References Cited by the Examiner

UNITED STATES PATENTS

| | | | |
|---|---|---|---|
| 110,882 | 1/71 | Whitestone | 50—162 |
| 697,498 | 4/02 | Kraus | 18—13 |
| 1,411,172 | 3/22 | Kaye | 50—538 |
| 1,918,127 | 7/33 | Pfeiffer | 18—13 |
| 2,052,229 | 8/36 | Hyde | 50—375 |
| 2,378,801 | 6/45 | Sidell et al. | 50—268 |
| 2,505,647 | 4/50 | Norriss | 50—268 |
| 2,837,910 | 6/58 | Steed | 50—538 |
| 2,850,891 | 9/58 | Scheib | 50—536 |
| 2,877,530 | 3/59 | Winn | 25—131 |
| 2,888,819 | 6/59 | Sitton | 50—268 |

(Other references on following page)

UNITED STATES PATENTS

| | | | |
|---|---|---|---|
| 2,944,370 | 7/60 | Malarkey | 50—52 |
| 2,958,918 | 11/60 | MacMillan | 50—52 |
| 2,977,632 | 4/61 | Bunch | 18—13 |

FOREIGN PATENTS

| | | |
|---|---|---|
| 500,558 | 1920 | France. |
| 35,180 | 1886 | Germany. |

OTHER REFERENCES

New Methods for Fabrication of Styropor, pp. 1, 3, 12, 13, 17 and 24, by Dr. Ing. Fritz Stastny, reprinted from Der Plastverarbeiter, 7, 242, to 250 (1955), Badische Anilin and Soda-Fabrik AG., Ludwigshafer am Rhine, Div. 15, book coded TP 986S7B3, Scientific Library.

Science News-Letter, page 7, Jan. 2, 1960, class 50, subclass 52.

EARL J. WITMER, *Primary Examiner.*

WILLIAM I. MUSHAKE, *Examiner.*